United States Patent [19]

Suvada

[11] Patent Number: 5,278,696
[45] Date of Patent: Jan. 11, 1994

[54] HEAD-UP DISPLAY SYSTEM
[75] Inventor: Thomas C. Suvada, Palos Verdes Estates, Calif.
[73] Assignee: Kaiser Aerospace & Electronics Corporation, Foster City, Calif.
[21] Appl. No.: 887,546
[22] Filed: May 22, 1992
[51] Int. Cl.⁵ .................. G02B 27/14; G02B 27/12
[52] U.S. Cl. ................................. 359/629; 359/640
[58] Field of Search ............ 359/629, 630, 632, 633, 359/639, 640, 831, 833, 834; 340/705

[56] References Cited

U.S. PATENT DOCUMENTS

| | | | |
|---|---|---|---|
| 4,099,841 | 7/1978 | Ellis | 359/630 |
| 4,218,111 | 8/1980 | Wirthington et al. | 340/705 |
| 4,655,540 | 4/1987 | Wood et al. | 359/630 |
| 5,200,844 | 4/1993 | Suvada | 340/705 |

Primary Examiner—Richard A. Bertsch
Assistant Examiner—Charles G. Freay
Attorney, Agent, or Firm—Marvin H. Kleinberg

[57] ABSTRACT

An improved head up display utilizes a prism to direct the image of a display CRT upward to a semi-transparent combiner element, permitting a substantially smaller vertical profile of the overall structure. An image is presented to a viewer that appears to be at infinity and is indistinguishable from the exterior scene as viewed from that vantage point. In alternative embodiments, the display unit can utilize more than one prism with one or more combiner elements to increase the vertical height of the viewed image of the CRT while dramatically reducing the vertical space required for the display unit in an instrument panel.

6 Claims, 5 Drawing Sheets

LPH IBFOV COMPARE TO F-18 HUD IBFOV

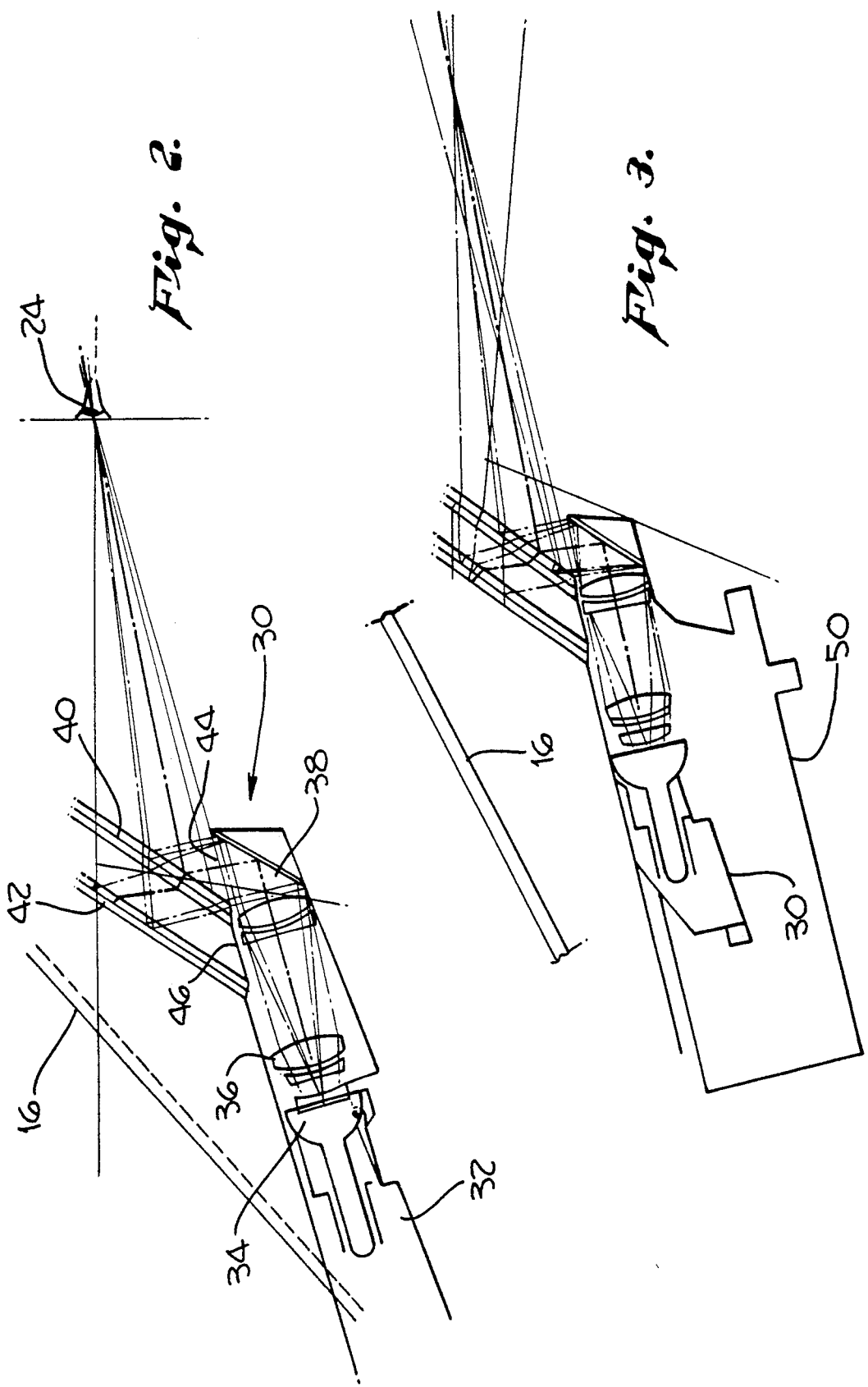

HEAD-UP DISPLAY SYSTEM

The present invention relates to "head-up" display systems and, more particularly, a head-up display system capable of being packaged in a vertically "shorter" enclosure while maintaining a vertically larger instantaneous field of view image to the viewer.

Many vehicles and aircraft, especially, have been fitted with optical systems that project an image which to the operator appears to be a part of the exterior scene that is viewed from the interior of the vehicle. The earliest applications of the concept were gun sight aiming systems in which a target reticle was provided which the vehicle operator could use to align the vehicle with a target and which would thereby aim the vehicle weapons systems at the selected target.

These optical systems have been utilized in aircraft and in some weapons system that were not even part of a vehicle. In recent years, head-up display systems have become a vital part of the cockpit of fighter and attack aircraft, and, to a lesser extent, in commercial aircraft. Special head up displays have been employed in some spacecraft and are in use in the space shuttle.

In recent years, with the advent of more sophisticated computer systems and symbol generation techniques, head up display systems have been used to place additional information in the field of view of the vehicle operator or pilot so that it becomes less necessary to look away from the scene normally visible through the windscreen in order to glance at the instrument panel. Providing the head up display enables the pilot to pay more attention to the situation around him and avoids the need to refocus the eyes which would otherwise be required if the instrument panel were to be read.

Head up displays of the prior art, such as that shown in the patent to Dowell, U.S. Pat. No. 4,001,499, issued Jan. 4, 1977, include electronic image generating means which create a visible image on a cathode ray tube ("CRT"). Because of the crowded conditions in the instrument panel, and the generally elongate shape of the CRT, the assembly is usually packaged in a substantially rectangular box that is placed with its long axis generally parallel to the axis of the aircraft. This image thus produced on the face of the CRT will then be substantially below the line of the pilot's normal view through the windscreen.

The image thus generated must then be projected vertically to a semi reflective combiner element through which the pilot views the windscreen and the scene exterior thereto. To the pilot's eye, the exterior scene then includes the generated images which may include attitude information, numerical information relative to course and speed, and may include gun sight features, as well which could be related to the aircraft weapon systems, in the case of military aircraft.

As shown in prior art systems, a reflective mirror was generally inserted between the optical lenses in order to direct the images generated on the CRT vertically to the combiner element. In order to display a substantial portion of the face of the CRT to the pilot at his relatively fixed position in the cockpit, a relatively large mirror was required. This, in turn, controlled the vertical height of the "box" in which the optics were housed.

Within an aircraft cockpit, there are certain constraints to the placement of any instrument, including the head-up display. First, there is the pilot's line of sight out of the windscreen or, the "over the nose vision line", which should not be occluded in order to afford maximum visibility of the airspace surrounding the aircraft. Certainly, when taking off, landing or taxiing, there is a need that the pilot have an unobstructed view of the ground and the objects in the path of the aircraft.

Another constraint is the line of the windscreen which dictates the height, placement and orientation of any combiner elements that may be utilized. Finally, there is an "ejection" line which defines an area that must remain unobstructed if the pilot is forced to eject from the aircraft. This limits the extent to which instruments can intrude into the cockpit, proper.

BRIEF SUMMARY OF INVENTION

Because of the constraints on the space available in the instrument panel, it would be highly desirable to reduce the height dimensions of the display to the greatest extent possible without adversely affecting the size of the projected image which, ideally, would be coextensive with the pilot's field of view through the windscreen. In prior art devices which utilized a mirror within the optics to direct the displayed image upward into the combiner screen, a rather large mirror was required to assure that the projected image would occupy the field of view.

In accordance with the present invention, a prism with one or more internal partially reflecting surfaces is supplied to redirect the projected image to the combiner element. This optical element, when used in conjunction with a suitably designed combination of lens elements for light collimation, can, in equipment having a markedly reduced vertical profile, supply a projected image that is almost as large as that furnished by the systems employing mirrors and requiring greater vertical space. If a second combiner element is utilized in tandem, the apparent vertical size of the image is expanded.

The use of the prism effectively shortens the distance from the pupil of the pilot to the aperture or "knothole" through which the display is effectively viewed. Because the projection system creates the illusion that the display is at a distance, the combination of the display with the scene actually viewed through the windscreen gives the appearance that the information and symbols generated on the face of the cathode ray tube ("CRT") are superimposed upon the scene. This enables the pilot to "see" objects and symbols as apparently exterior to the aircraft and within the distance for which his eyes have been focussed.

Because the path of the image through the prism does not diverge as much as it would in air, substituting a prism for a mirror provides an acceptable field of view with a substantial saving in vertical height of the device. A relatively compact prism can change the direction of the light path as effectively as a mirror that may occupy more than two or three times the vertical space.

An additional advantage stemming from the use of a prism and one or more combiner screens is that the refraction of light through the combiner displaces the light path in the vertical direction, thereby permitting a slightly higher instrument enclosure without interfering with forward, "over the nose" vision. As a result, the head up display instrument can better accommodate instruments positioned below it in the instrument panel.

In alternate embodiments, multiple reflecting surfaces in the prism may be used in combination with one or more combiner element to expand the field of view in the vertical direction. Utilizing more than one reflector in the prism permits the observer to view more of the display element, therefore placing more information into the scene viewed by the observer and provides more of the image with less head motion of the observer. In one arrangement, two prisms directed images to two, substantially parallel combiner elements which resulted in roughly four images being brought to the eye of the observer, each image representing a different "slice" of the face of the display device.

In an alternative embodiment, a plurality of prisms are used in conjunction with two combiner screens. However, only the image from one of the prisms is applied to both combiner elements. The images from the other prisms are all directed to the observer through only one of the combiner elements. In such an embodiment, the several prisms may be "staggered" so that the reflecting surfaces of the prisms closest to the display apparatus do not intercept a portion of the image that is reflected by more remotely located prism reflecting surfaces.

BRIEF DESCRIPTION OF THE DRAWINGS

Further advantages and features of the present invention will be more fully apparent to those skilled in the art to which the invention pertains from the ensuing detailed description thereof, regarded in conjunction with the accompanying drawings wherein like reference characters refer to like parts throughout and in which:

FIG. 2 is a side section view of a preferred embodiment of a display unit according to the present invention;

FIG. 3 is a side section view of the preferred embodiment of the display unit of FIG. 2 superimposed on the prior art display unit previously designed for the same aircraft;

Figure 1:
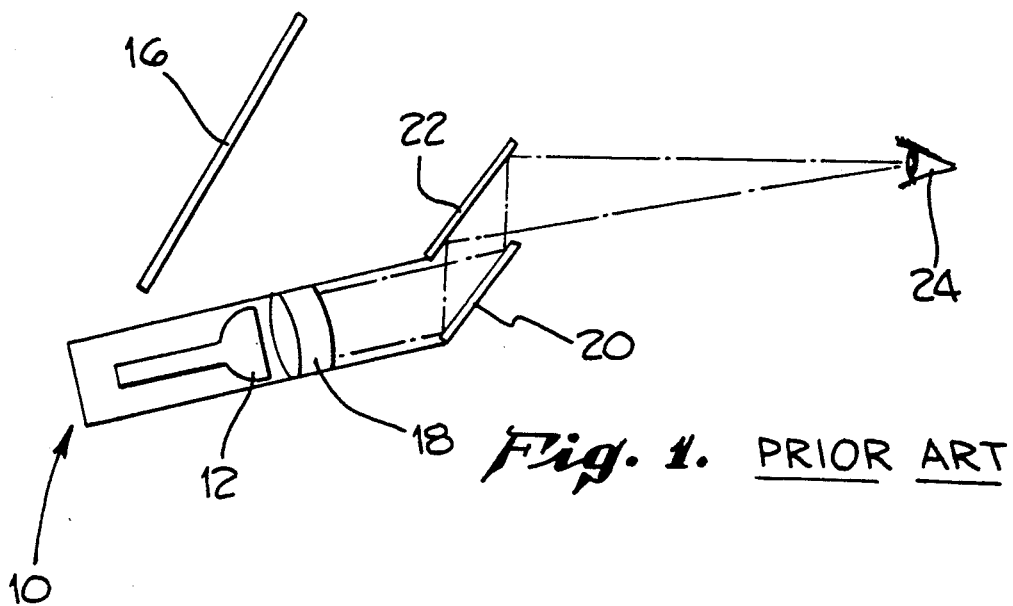
FIG. 1 is a generalized side section view of a display unit of the prior art.

Turning first to FIG. 1, there is shown a prior art head up display system 10 such as is illustrated in the patent to Dowell, U.S. Pat. No. 4,001,499. A CRT 12 is housed in an enclosure 14 which is mounted in an aircraft cockpit beneath the windscreen 16. A lens system 18 directs images which are generated on the face of the CRT 12 to a mirror 20 which redirects the image upward to a combiner element 22.

The combiner element 22, is partially reflective and partially transmissive so that an exterior scene can be viewed through the combiner screen 22 and the wind screen 16. The images which are reflected from the combiner screen 22 are directed to the eye 24 of the viewer and converge at an angle such that the image appears to the viewer as if it were located at infinity, in the real scene that can be seen through the wind screen 16.

A major disadvantage of the prior art head up display systems 10 was that if one wished to see the entire display that was available on the face of the CRT 12, a rather large mirror 20 was required. Because area and volume are rather critical when considering the limited space available in a crowded cockpit, having a large mirror forces a compromise of the size of the field of view with the space otherwise available to the head up display system.

Turning next to FIG. 2, there is shown a low profile head up display 30 according to a preferred embodiment of the present invention. A housing 32 contains the electronics and a cathode ray tube ("CRT") display element 34. A collimating lens group 36 collects the image from the face of the CRT 34 and directs it to a prism 38 which, through internal reflection, directs the image upward.

A semi-transparent combiner element 40 redirects the CRT image to eye 24 of the viewer. A further image which is outside of the normal field of view of the heretofore transmitted image, is directed to a second combiner element 42 which is positioned adjacent and parallel to the combiner element 40, and which directs the reflected images to the viewer's eye 24.

As shown, some of the optical rays are transmitted through the first combiner element 40 and are reflected by the second combiner element 42. The position of the observer's eye 24 is predetermined from a design of the cockpit area and the collimating lens group 36 is designed in conjunction with the prism 38 and the combiner screens 40, 42 so that the image presented to the eye 24 will appear to be at infinity and merged with the external scene as viewed through the windscreen 16.

The use of the combiner elements 40, 42 provides both a problem and, at the same time, an advantage that may be realized from that problem. In the preferred embodiment, the combiner screens 40, 42 are made up of semi transparent glass plates which introduce a certain amount of refraction to light rays traversing them. This refraction imparts a "periscope" effect to the "over the nose vision line" and allows further reductions in the height of the instrument housing in that region directly below the combiner screens.

Alternatively, if a slightly higher "over the nose" vision line is acceptable, then an increase in the height of the housing can be permitted without adversely affecting the pilot's field of view. This feature is illustrated in the stepped housing portions 44, 46 immediately behind the bases of the combiner elements 40, 42, respectively.

FIG. 3 gives an idea of the space savings than can be achieved through the use of the novel design of the preferred embodiment. A prior art head up display housing 50 is shown in outline form. The display unit 30 of FIG. 2 is shown superimposed upon the outline to illustrate the dramatic savings of height and depth that are achieved from the present design.

Figure 4:
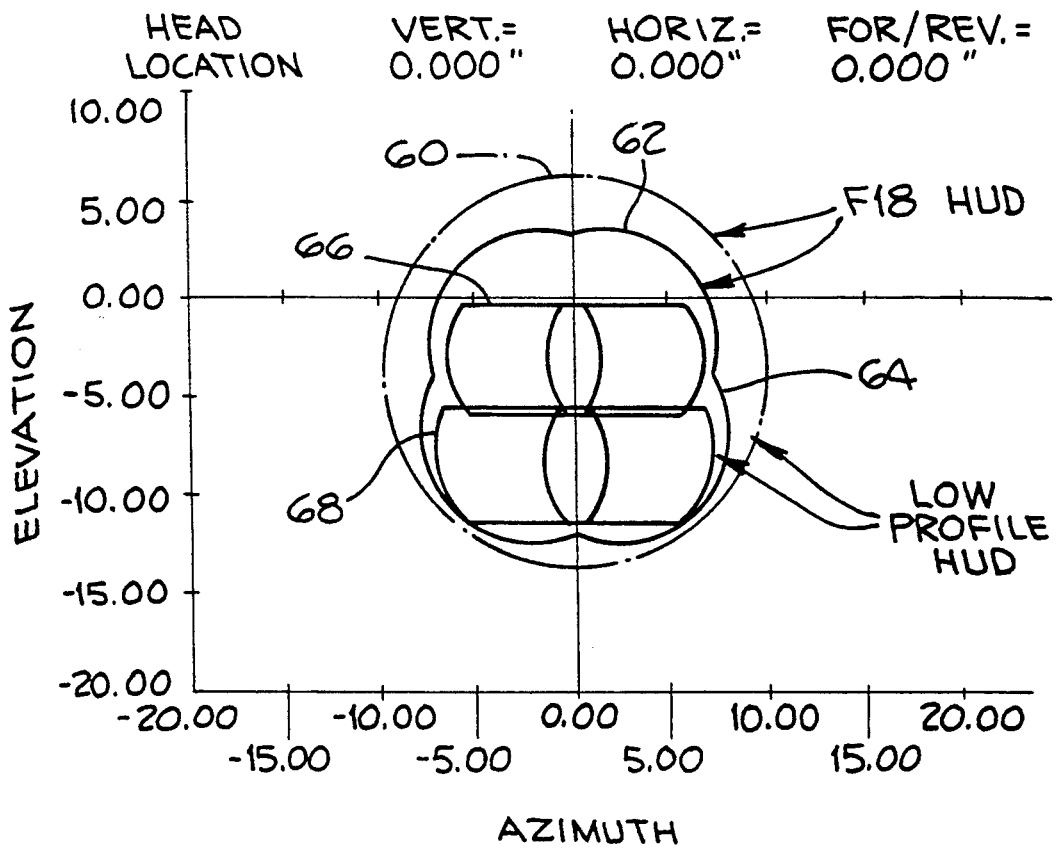
FIG. 4 is a representation of the instantaneous binocular fields of view available to a prior art display unit and the preferred embodiment of FIG. 2.

FIG. 4 gives a comparison of the instantaneous binocular field of view of a prior art display unit and a display unit according to the present invention. The crossing point of the vertical and horizontal axes represents the line of sight of the observer in the viewing position. The broken line 60 represents the maximum field of view of the CRT display device. The first and second pairs of overlapping circles 62, 64 represent the view presented by the prior art display device and the overlapping, elongated rectangular sections of overlapping circles 66, 68 represent the view presented by the improved display device of the present invention.

As seen, the present device provides virtually the same size display to the viewer as the prior art device, which takes up considerably more space in the instrument panel. As shown, each of the views is itself a composite of the scene presented to the eyes of the observer. The views seen by the right and left eyes overlap as do the views presented by the first and second combiner elements.

Figure 5:
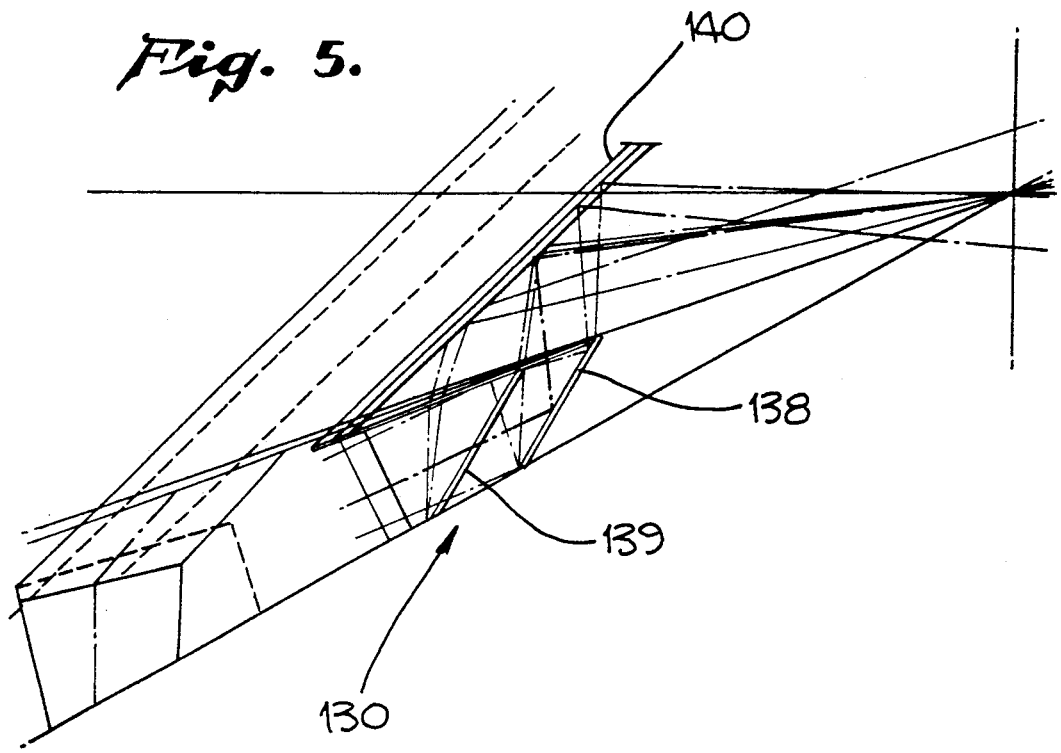
FIG. 5 is a side section view of an alternative embodiment of the display unit according to the present invention utilizing more than one prism element.

The vertical area of the CRT face visible to the observer can be further increased by increasing the number of prism and/or reflector surfaces in the optical path between the viewer and the CRT display. One such embodiment is illustrated in FIG. 5 which shows a display unit 130 that combines two prism/reflectors 138, 139 with a single combiner element 40. The collimating lens system has been designed to accommodate this arrangement.

Figure 6:
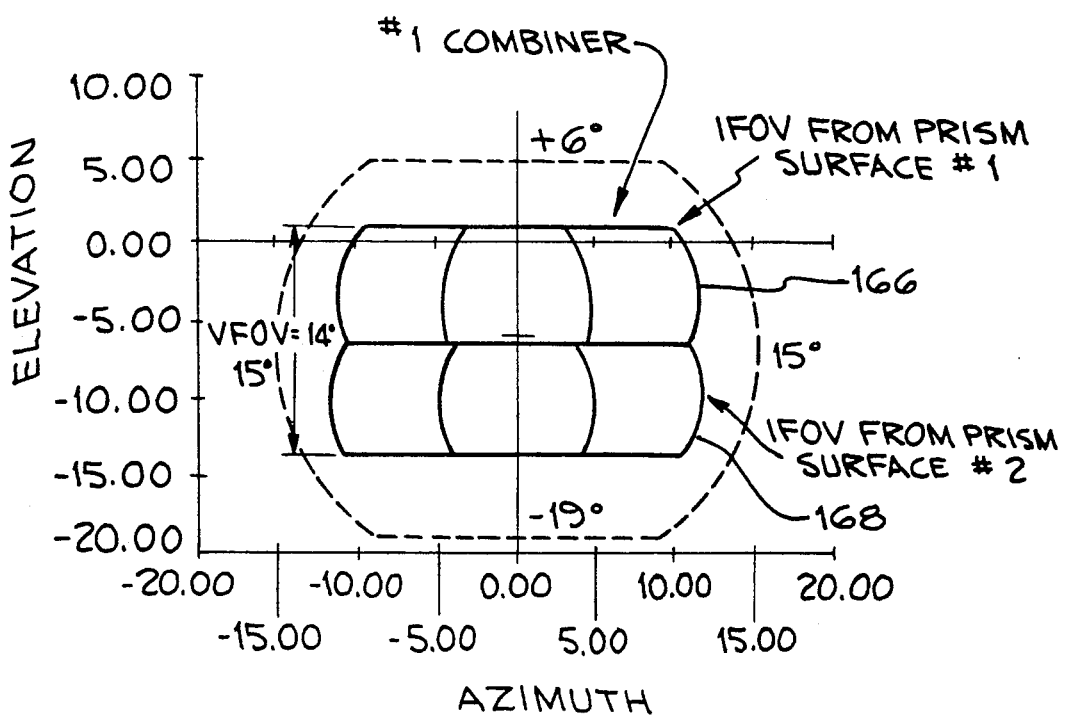
FIG. 6 is a representation of the instantaneous binocular field of view available with the alternative embodiment of FIG. 5.

The view available is shown in FIG. 6 and represents a slight improvement over the preferred embodiment. In this comparison, the trade off is two prisms rather than one in exchange for one combiner screen rather than two. As seen, the image 166 from the first prism 138 is adjacent the image 168 from the second prism 139. The combined images result in a view of the display that is at least as good as the preferred embodiment.

Figure 7:
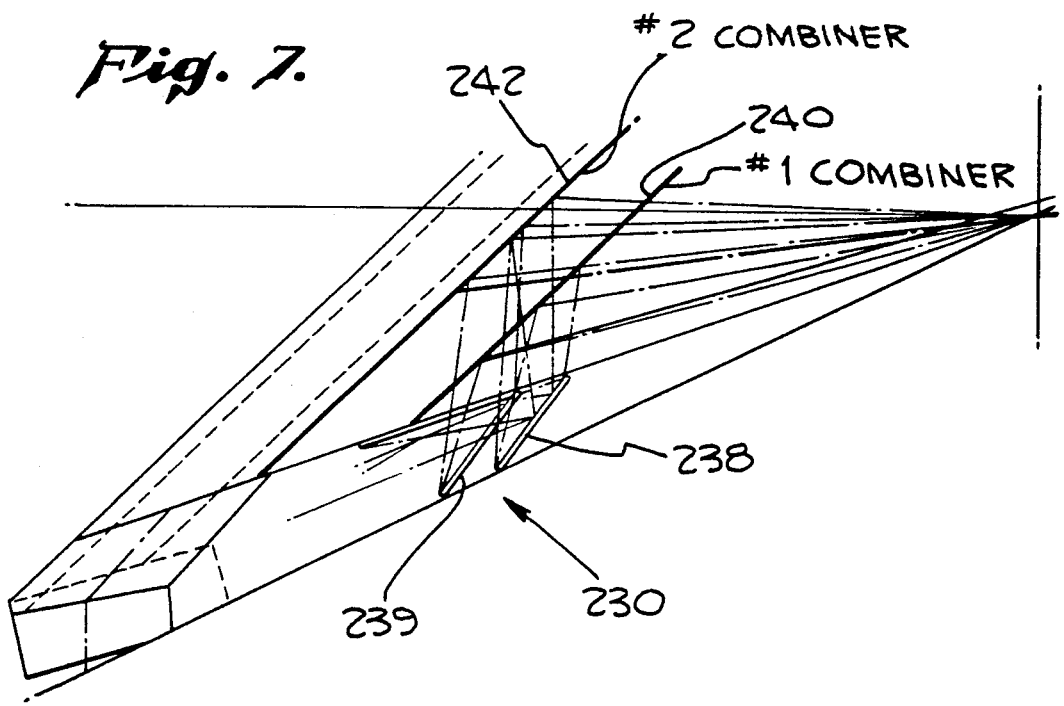
FIG. 7 is a side section view of yet another alternative embodiment of the display unit according to the present invention utilizing more than one prism element and more than one combiner element.
Figure 8:
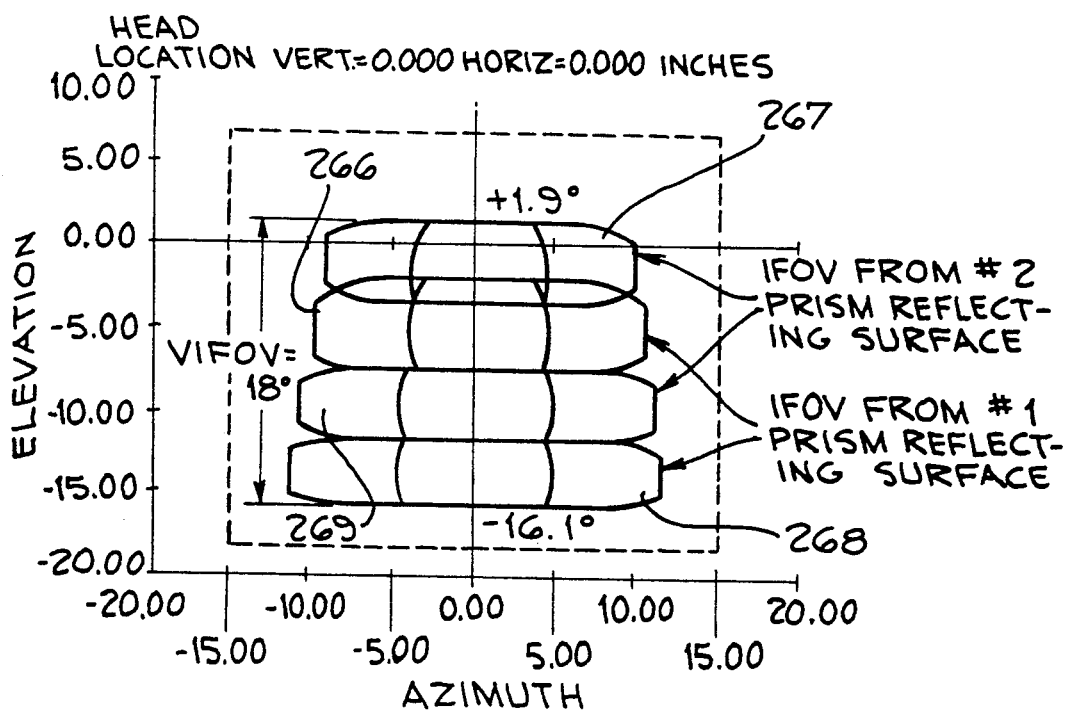
FIG. 8 is a representation of the instantaneous binocular field of view available with the alternative embodiment of FIG. 7.

Another alternative embodiment, shown in FIG. 7, is a display device 230 which employs two prisms 238, 239 and two combiner elements 240, 242 to provide the greatly improved (vertically) field of view shown in FIG. 8. The first combiner element 240 provides images 269, 268 from the first and second prisms 238, 239, respectively, and the second combiner element 242 furnishes images 267, 266 from the first and second prisms 238, 239, respectively. Taken together, the several images combine to present a substantial part of the CRT face.

Figure 9:
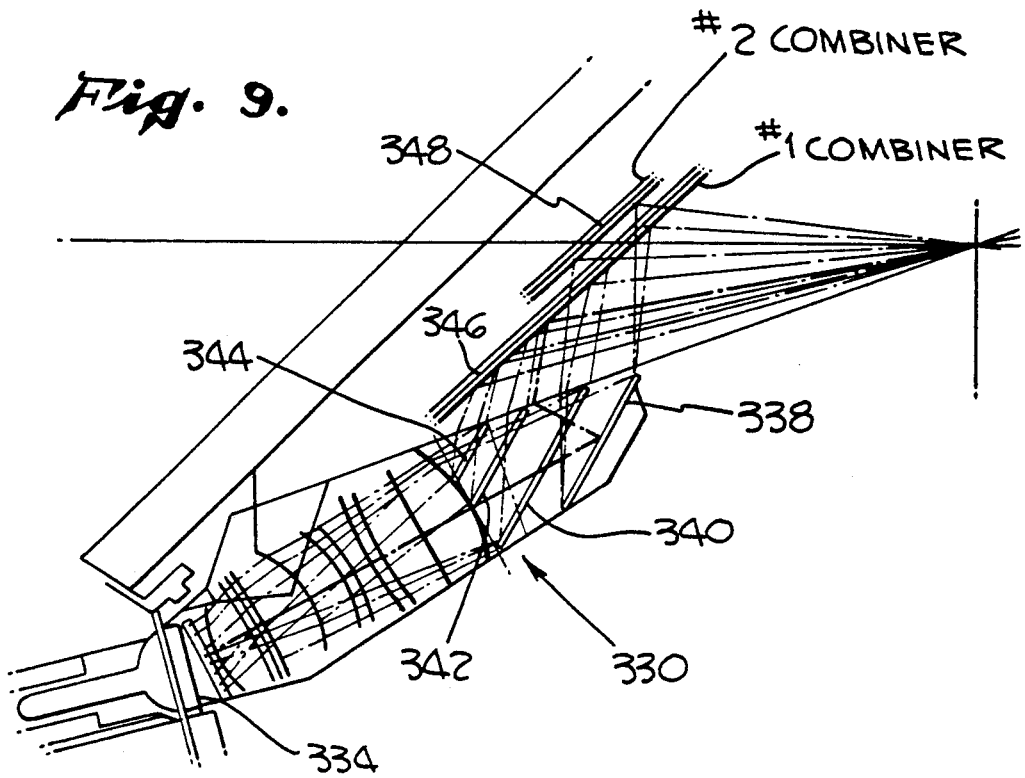
FIG. 9 is a side section view of still another alternative embodiment of the display unit according to the present invention utilizing more than one prism element and more than one combiner element.

Finally, another embodiment is shown in FIG. 9. A display unit 330 uses a plurality of prisms and more than one combiner element. As shown, a "first" prism 338 is located farthest from the screen of display CRT 334 and directs the images that it receives to both a first and a second combiner element 346, 348. Second, third and fourth prisms 340, 342, 344 direct their images only to the first combiner element 346.

As shown, the second prism 340 partially reflects and partially transmits the image to the first prism 338. However, the third and fourth prisms 342, 344 are smaller and only intercept a portion of the image, without attenuating that portion of the image that proceeds to the first and second prisms 338, 340. All of the prisms provide an image which is reflected from the first combiner element 346, but only the first prism 338 also provides an image to the second combiner element 348.

Figure 10:
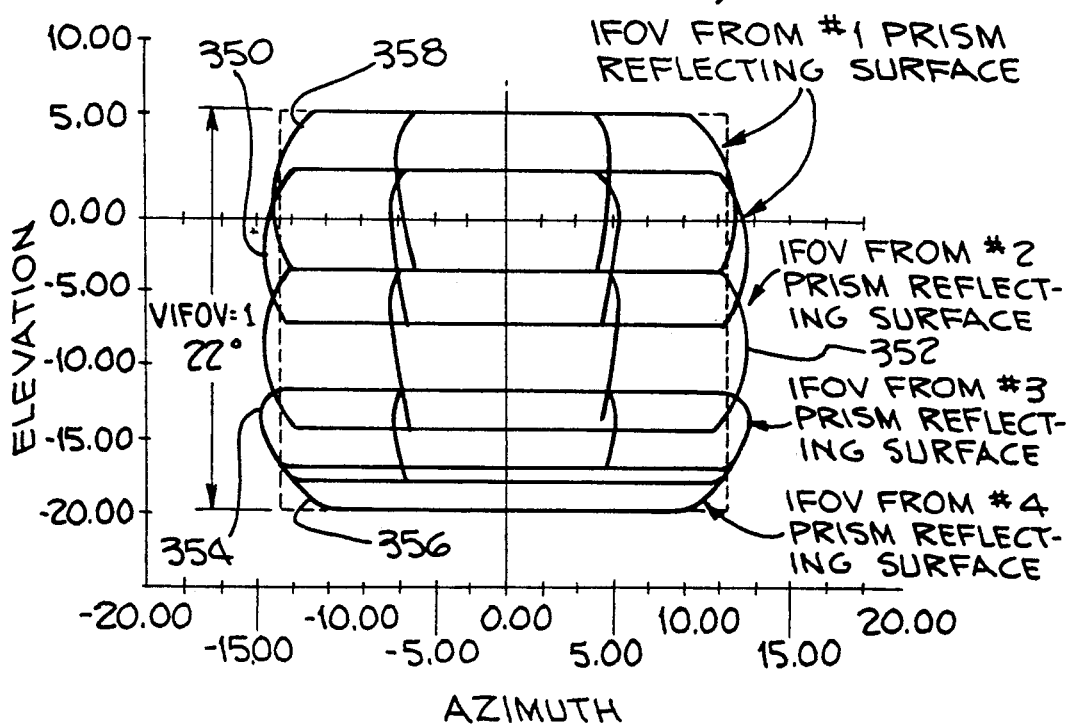
FIG. 10 is a representation of the instantaneous binocular field of view available with the alternative embodiment of FIG. 9.

The resultant instantaneous binocular field of view for such a combination is shown in FIG. 10. As seen, the views 350, 352, 354, 356 provided by the first combiner element 346 from the first through fourth prisms 338, 340, 342, 344, respectively, overlap each other and the view from the first prism 338 and second combiner element 348. The resulting combination image has almost 50% greater vertical height than the prior art display device while occupying substantially less vertical space in the instrument panel.

According to the present invention, display devices can be designed to present as much or as little of the surface of a display CRT as is desired using combinations of prisms and combiner screens in the optical path between the CRT and the eye of the observer. Depending upon the brightness of image available in the CRT and the relative attenuation of light by passage through prisms or semi reflective combiner elements, a designer can choose that combination that optimizes the available light from the display and external scene to combine them for the viewer.

Symbols and images are generated in various areas of the tube face that need not be connected to or correlated with other images or symbols appearing in other areas of the tube face. Accordingly, it is no great disadvantage that the various views overlap or that incremental areas of the CRT face are not in accurate "registration". So long as the elements are parallel, all of the images will appear in proper alignment.

According to the present invention, substantial savings in the "height" of a "head up" display unit can be achieved by replacing the mirrors employed in the prior art with one or more prisms. The prisms can occupy a vertically smaller enclosure while still providing an acceptable view of the display CRT screen. In alternate embodiments, more than one prism can be used in combination and one or more combiner elements supply a composite image to the viewer.

An incidental benefit arising from the use of the combiner elements is the ability to benefit from the refraction of the images that are transmitted through the combiner screen. The height of the display unit cabinet can be increased by an amount comparable to the vertical displacement of the optical rays resulting from the refraction. Alternatively, the height of the device "aft" of the screen can be reduced, thereby reducing the vertical space occupied by the device at the instrument panel.

Thus there has been shown and described a novel head up display unit that can provide an acceptable field of view of a CRT display screen in a cabinet that occupies much less vertical space than does the display units of the prior art. Other variations may occur to those skilled in the art and, accordingly, the scope of the invention should be limited only by the scope of the claims appended hereto.

What is claimed as new is:

1. In a head-up display system for use in a vehicle having a principal axis and a transparent windscreen, the combination comprising:
 (a) image generating means;
 (b) image combining means positioned in the line of sight between an observer within the vehicle and the windscreen to provide a superposition of a generated image over the scene visible to the observer through the windscreen;
 (c) image collimating means for applying an image generated by said image generating means to said image combining means including a first lens group for transmitting generated images in a first direction substantially parallel to the vehicle axis;

(d) a prism operable with said first lens group to direct generated images to said image combining means through internal reflection; and (e) a second prism adjacent said prism adapted to direct images from said collimating means to said image combining means to increase the effective field of view of the image generating means for the observer within the vehicle, whereby generated images appear to the observer within the vehicle as if they were located at a distance so that scenes visible to the observer through the windscreen appear to include the generated images.

2. The apparatus of claim 1, above, further including a third prism adjacent said second prism and said prism adapted to direct images from said collimating means to said image combining means to increase the effective field of view of the image generating means for the observer within the vehicle.

3. The apparatus of claim 1, above, wherein said image combining means include first and second partially reflecting elements, each positioned to direct collimated images from said prism to the observer within the vehicle to increase the effective field of view of the image generating means.

4. The apparatus of claim 3, above, further including a second prism adjacent said prism adapted to direct images from said collimating means to said image combining means to increase the effective field of view of the image generating means for the observer within the vehicle.

5. The apparatus of claim 4, above, further including at least a third prism adjacent said second prism adapted to direct images from said collimating means to said image combining means, wherein at least some of said prisms direct their images to only one of said combining screens and wherein some of said prisms direct their images to more than one of said combining screens.

6. The apparatus of claim 1, above, further including a plurality of additional prisms adjacent said first prism, each adapted to direct an image to said combining means and to the succeeding prisms for redirection to said combining means, said combining means further including at least two partially reflective combining screens adapted to direct images from said prisms to the observer within the vehicle, and wherein some of said prisms apply their images to one of said screens and some of said prisms apply their images to more than one of said screens for increasing the effective field of view of said image generating means for the observer.

* * * * *